(12) United States Patent
Hamerski

(10) Patent No.: US 6,406,781 B1
(45) Date of Patent: Jun. 18, 2002

(54) STRETCH RELEASE ADHESIVE ARTICLE WITH STABILIZER

(75) Inventor: Michael D. Hamerski, Baldwin Township, WI (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 09/103,274

(22) Filed: Jun. 23, 1998

(51) Int. Cl.[7] .................................................. B32B 3/26
(52) U.S. Cl. .................... 428/317.3; 428/156; 428/354; 248/205.3; 248/467; 248/683
(58) Field of Search ............................. 428/354, 317.3, 428/156; 248/683, 205.3, 467

(56) References Cited

U.S. PATENT DOCUMENTS

| | | |
|---|---|---|
| 5,409,189 A | 4/1995 | Lühmann |
| 5,507,464 A | 4/1996 | Hamerski |
| 5,516,581 A | 5/1996 | Kreckel |
| 5,928,747 A * | 7/1999 | Luhmann .................... 428/40.1 |
| 6,001,471 A * | 12/1999 | Bries .......................... 428/343 |

FOREIGN PATENT DOCUMENTS

| | | |
|---|---|---|
| DE | 197 29 706 A1 | 3/1998 |
| DE | 196 37 223 A1 | 4/1998 |

* cited by examiner

*Primary Examiner*—Blaine Copenheaver
*Assistant Examiner*—Christopher Paulraj
(74) *Attorney, Agent, or Firm*—David B. Patchett

(57) ABSTRACT

An adhesive article adapted for removable adhesive bonding on a support surface, such as a wall, includes a base member and a stretch release adhesive tape strip. The adhesive tape strip is a sequential release-type adhesive strip having a non-adhesive end portion which allows the base member to release from the adhesive strip during the removal process while the adhesive strip remains adhered to the support surface, therefore reducing the incidence of unwanted catapulting. To prevent relative movement between the base member and the adhesive strip during the removal process and therefore increase the likelihood of successful controlled sequential release of the base member, the base member includes a stabilizer arranged to abut the adhesive strip if the base member shifts as the adhesive strip is stretched during removal. The stabilizer can be a generally rigid projection or a compressible stop member which extends outwardly from the end of the base member adjacent the end of the adhesive strip.

9 Claims, 3 Drawing Sheets

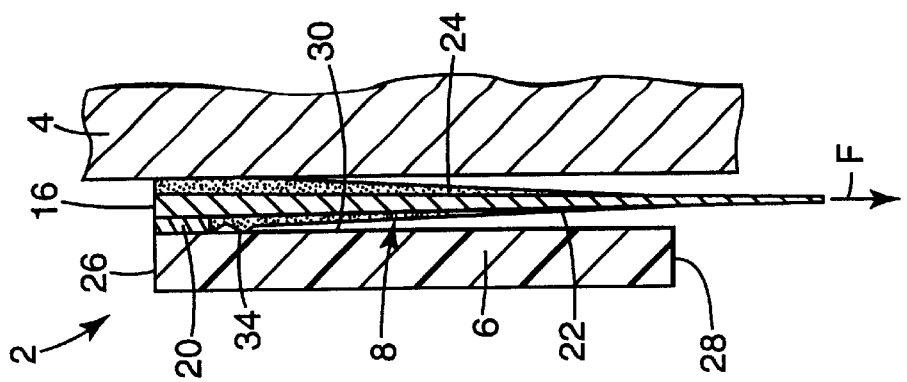
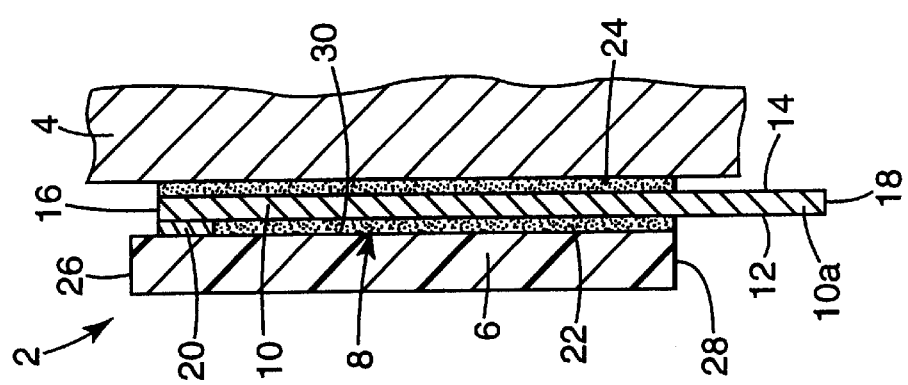
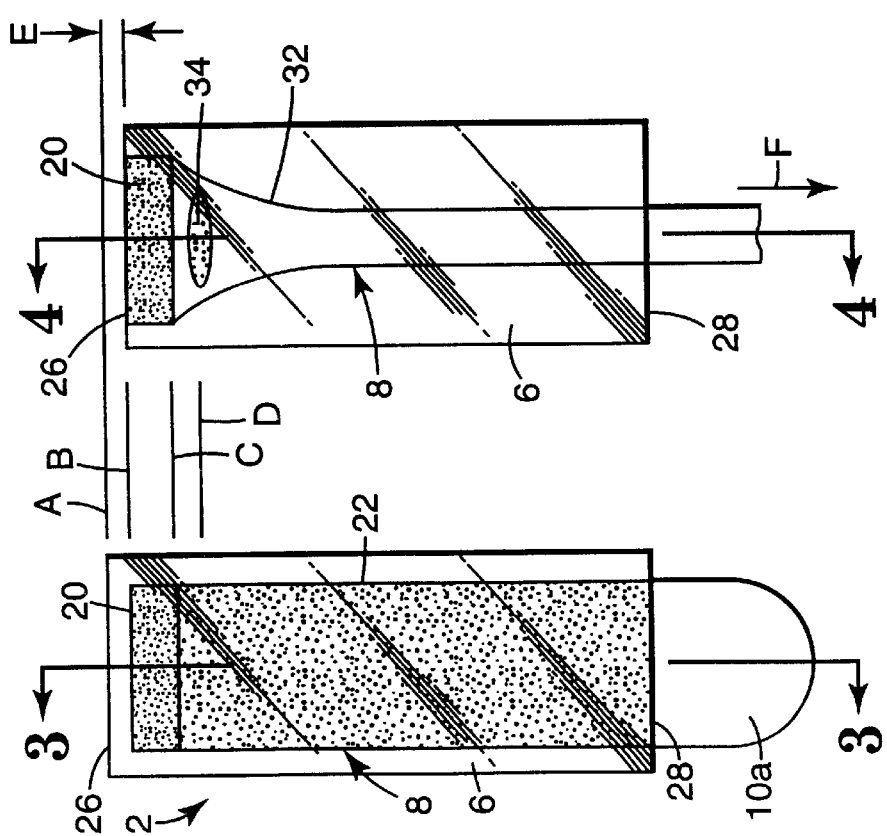

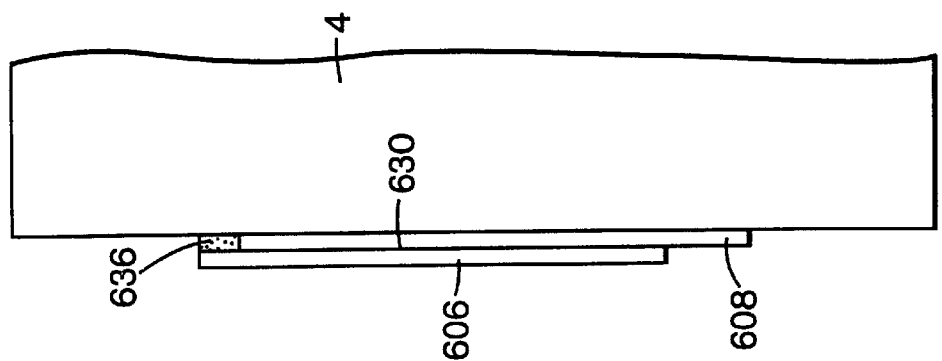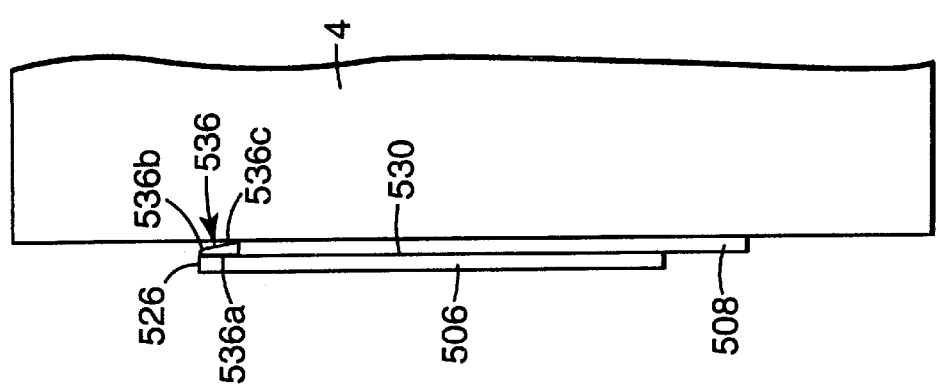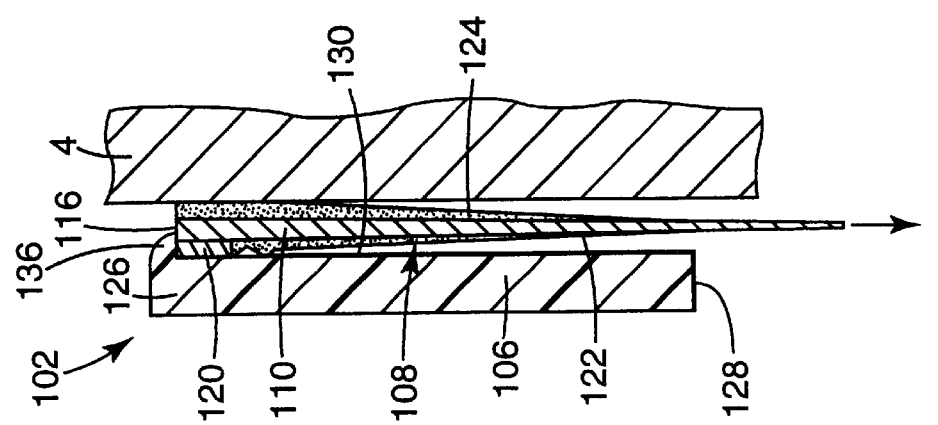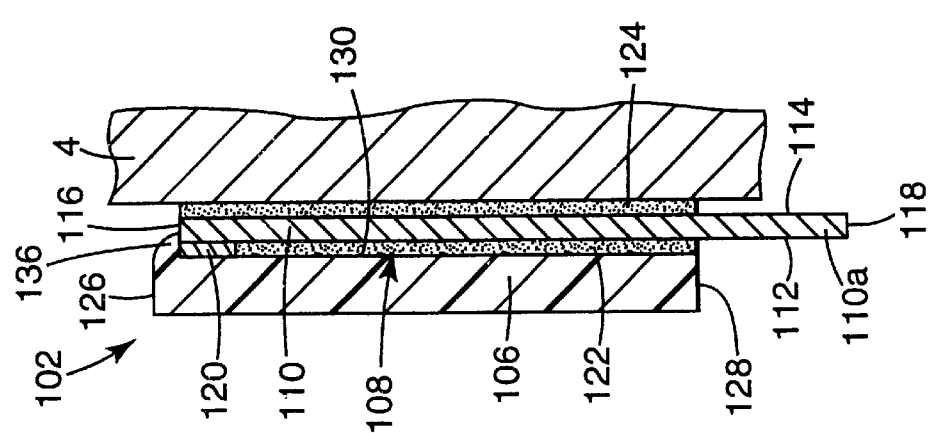

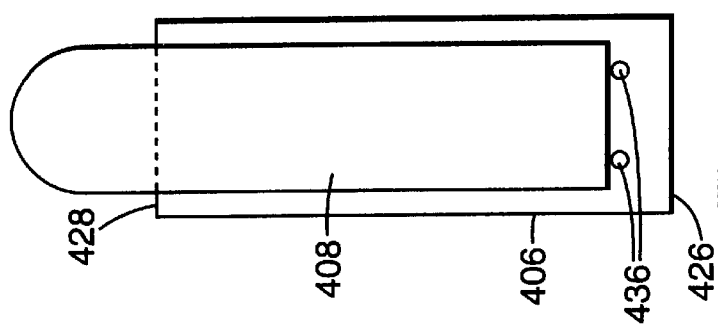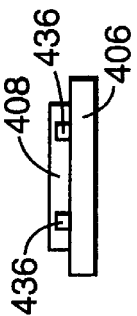
Fig. 9a Fig. 9b
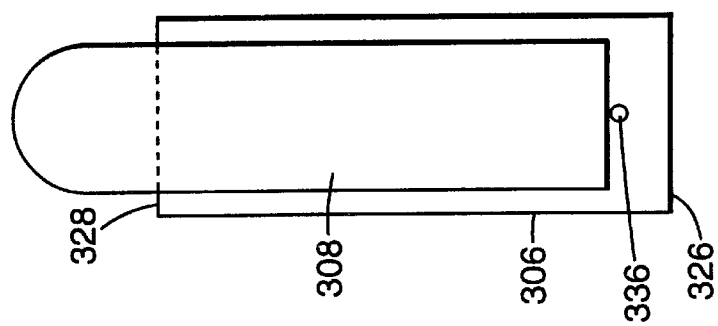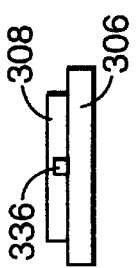
Fig. 8a Fig. 8b
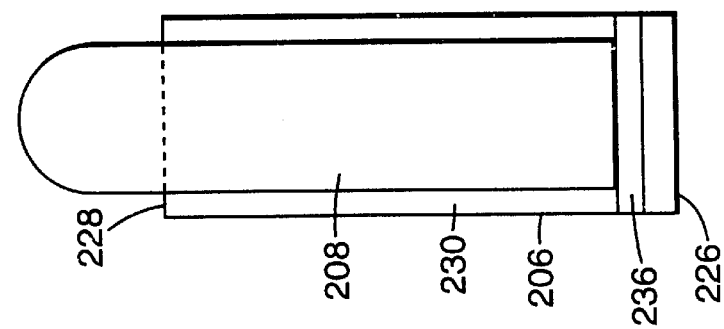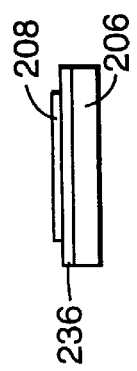
Fig. 7a Fig. 7b

STRETCH RELEASE ADHESIVE ARTICLE WITH STABILIZER

FIELD OF THE INVENTION

The present invention relates generally to adhesive articles including a base member and a stretch release adhesive tape strip for removably bonding the base member to a surface and, more particularly, to such an adhesive article wherein the base member includes a stabilizer which restricts relative movement between the base member and adhesive strip.

BACKGROUND OF THE INVENTION

Adhesive tapes which can be cleanly removed from a surface by stretching the tape are known in the prior art. The Kreckel et al U.S. Pat. No. 5,516,581, for example, discloses a removable adhesive tape strip including a highly extensible and substantially inelastic backing and a layer of pressure sensitive adhesive. When applied to a support surface, the adhesive tape strip becomes firmly bonded thereto, but can be easily removed without damaging the support surface by simply stretching the tape.

Stretch release adhesive tape strips have been used in a wide variety of applications including removably mounting an object, such as a hook or hanger, on a wall. Conventional techniques for mounting a hook on a wall include driving a fastener, such as a nail or screw, into the wall, therefore creating a hole or otherwise damaging the wall. Stretch release adhesives tapes, in contrast, allow an item to be mounted on and removed from a wall without damaging the wall. Stretch release adhesive tape strips offer the additional advantage of working on a wide variety of wall surfaces including sheet rock, tile, and concrete, which are not well suited for conventional mounting techniques.

The Hamerski et al. U.S. Pat. No. 5,507,464 discloses an article support including a base member, a double-sided stretch release adhesive tape strip adhered to the base member, and a mechanism for gripping the stretch release adhesive tape strip. The base member and adhesive tape strip are arranged so that when the base member is adhered to a support surface by the tape, the base member can be released by pulling on the gripping means. The Lühmann U.S. Pat. No. 5,409,189 discloses a double-sided, re-detachable, self-adhesive hook including a strip of adhesive film which re-separably bonds the hook to a support surface. The adhesive power of the film largely disappears on extension of the film which is accomplished by pulling on the adhesive film. While such articles generally function satisfactorily, removal of double-sided adhesive tape strip articles can present certain difficulties. For example, in situations where a double-sided stretch release adhesive tape strip is used to adhere an object, such as a plastic hook, to a wall, the release of the adhesive tape strip from both the object and the wall at the same time may cause the adhesive tape strip to snap-back in the direction of the stretching, in a manner similar to the snapping effect of a stretched rubber band, or may cause the object to be catapulted, particularly if the object is not held in place during removal.

U.S. Pat. No. 6,106,630, which is assigned to the same assignee as the present invention and which is hereby incorporated by reference, discloses an adhesive article including a base member and a stretch release adhesive tape strip which can be removed from a support surface without snap-back or catapulting. The adhesive article includes abutment means adapted to engage the support surface when the article is pressed against the support surface during the removal process. By pressing the article against the support surface, the article is held in place as the adhesive strip is stretched and catapulting is therefore avoided. If the article, however, is not held securely against the support surface, catapulting may occur.

U.S. Pat. No. 6,001,471, which is assigned to the same assignee as the present invention and which is hereby incorporated by reference, discloses an improvement to double-sided stretchable adhesive tape strips which minimizes the aforementioned problems of snap-back and catapulting by controlling the timing of the debonding from both the object and the support surface so that one adhesive surface releases before the other. More particularly, the adhesive tape strip includes a lower adhesion portion on one surface and a greater adhesion portion on the surface opposite the lower adhesion portion, whereby during removal, the greater adhesion portion remains more aggressively adhered to either the support surface or the object, and the lower adhesion portion completely releases from its associated surface. The lower adhesion portion may be, for example, a release strip which completely debonds from its adhered surface prior to the complete debonding of the other side. Although sequentially controlling the release of the adhesive surfaces minimizes the problems of snap-back and catapulting, it does not entirely eliminate these problems. For example, if the adhesive bond between the adhesive tape strip and the support surface is inadequate, the adhesive tape strip will not release from the object before releasing from the support surface. Such an inadequate bond could result, for example, if the support surface is not clean, if the installer does not press the object against the support surface with enough force, or if the support surface does not have compatible properties. Under such circumstances, the object may catapult during the removal process.

It would therefore be desirable to provide an adhesive article which further minimizes the problems of snap-back and catapulting. More specifically, it would be desirable to provide an adhesive article using a sequential release adhesive strip which can be removed from a support surface without snap-back and catapulting and which does not require the article to be pressed firmly against the support surface during the removal process.

SUMMARY OF THE INVENTION

The present invention provides an adhesive article which is adapted to be mounted on a support surface, such as a wall. The article includes a base member and a stretch release adhesive tape strip arranged between the base member and the support surface. The stretch release adhesive tape strip includes a backing layer having opposite top and bottom surfaces and first and second ends. The bottom surface is provided with adhesive extending from the first end to the second end. The top surface includes a release area adjacent the first end and a second portion which extends from the release area to the second end. The release area has a low level of adhesive strength relative to the second portion and is preferably adhesive free. Thus, under normal circumstances, as the adhesive strip is stretched during the removal process and progressively debonds from the base member and the support surface, the base member will release from the adhesive strip when the debonding point reaches the release zone, and will therefore release from the adhesive strip before the adhesive strip releases from the support surface.

The base member includes a generally planar bottom surface which is adhered to the top surface of the adhesive strip, and may further include a hook or hanger portion opposite the planar bottom surface. In accordance with a characterizing feature of the invention, the base member includes a stabilizer which prevents relative movement between the adhesive strip and the base member and therefore increases the likelihood of successful sequential release. The stabilizer extends from the bottom surface of the base member adjacent the adhesive strip release zone so that it will abut the adhesive strip if the base member shifts relative to the adhesive strip during the removal process. By preventing relative movement between the adhesive strip and the base member, the stabilizer helps ensure that the base member will release from the adhesive strip before the adhesive strip releases from the support surface, and in this way helps prevent the base member from catapulting.

In one embodiment, the stabilizer is a rigid hook or projection which extends from the bottom surface of the base member adjacent the end of the adhesive strip. To allow the adhesive strip to be pressed firmly against the support surface, the projection extends a distance which is less than the thickness of the adhesive strip.

In another embodiment, the stabilizer is a flexible or compressible stop member arranged on the bottom of the base member adjacent the end of the adhesive strip. The stabilizer can be a folded piece of synthetic plastic material which forms a V-shaped configuration. One leg of the V is connected with the base member and the second leg extends in the direction of the adhesive strip so that it will engage the adhesive strip if the base member begins to move relative to the adhesive strip during the removal process. Alternatively, the stabilizer can be formed of a compressible polymeric foam which extends from the bottom of the base member adjacent the end of the adhesive strip. The surface of the foam stabilizer adjacent the support surface can include a repositionable or low strength adhesive which serves to temporarily bond the base member to the support surface following the stretch removal of the adhesive strip from the base member and support surface, and therefore allows the base member to be easily and predictably removed from the support surface.

BRIEF DESCRIPTION OF THE DRAWING

The present invention will be further described with reference to the accompanying drawings, in which:

FIG. 1 is a top view of an adhesive article according to the prior art in its mounted condition;

FIG. 2 is a top view of the adhesive article of FIG. 1 during the removal process;

FIG. 3 is a cross-sectional view taken along line 3—3 of FIG. 1;

FIG. 4 is a cross-sectional view taken along line 4—4 of FIG. 2;

FIG. 5 is a cross-sectional side view of an adhesive article according to the invention in its mounted condition;

FIG. 6 is a cross-sectional side view of the adhesive article of FIG. 5 during the removal process;

FIGS. 7a and 7b are bottom and end views of a second embodiment of the invention, respectively;

FIGS. 8a and 8b are bottom and end views of a third embodiment of the invention, respectively;

FIGS. 9a and 9b are bottom and end views of a fourth embodiment of the invention, respectively;

FIG. 10 is a side view of a fifth embodiment of the invention; and

FIG. 11 is a side view of a sixth embodiment of the invention.

DETAILED DESCRIPTION

In order for the specific improvements of the present invention to be easily understood and appreciated, the construction and operation of the currently known stretch releasing adhesive articles will be described in detail. Throughout the description and the accompanying figures, functionally similar features are referred to with like reference numerals incremented by 100.

Referring first to FIGS. 1–4, there is shown a typical adhesive article 2 mounted on a support surface 4. The adhesive article 2 includes a base member 6 and a stretch releasing adhesive tape strip 8 which adhesively bonds the base member 6 to the support surface 4. The base member 6 is illustrated as being formed of a transparent material to facilitate the understanding of the stretch removal process. The adhesive strip 8 is a sequentially releasing adhesive strip which includes a backing layer 10 having opposite top and bottom major surfaces 12, 14, respectively, first and second ends 16, 18, respectively, and includes a tab portion 10a which can be gripped and pulled by a user to effect the stretch release of the adhesive strip 8. The backing layer top surface 12 has a first end portion adjacent the adhesive strip first end 16 which defines a release area 20 which permits controlled sequential release of the base member 6 from the adhesive strip 8, and a second end portion having a layer of adhesive 22 which extends from the release area 20 to the backing layer second end 18. The release area 20 can include a release strip which provides a non-adhesive zone, or the release area 20 can include any conventional material or treatment for rendering the release area non-adhesive. The backing layer bottom surface 14 includes an adhesive layer 24 for adhesively bonding the adhesive strip 8 to the support surface 4 that extends from the first end 16 to the second end 18 of the backing layer 10. The base member 6 includes first and second ends 26, 28, respectively, and a generally planar bottom surface 30 that overlays the release area 20 and is normally adhesively bonded with the adhesive layer 22.

As shown in FIGS. 2 and 4, the adhesive article is removed by applying a force F to the tab portion 10a of the backing layer 10 which causes the backing layer 10 and adhesive layers 22 and 24 to stretch. Upon stretching, the adhesive strip 8 is elongated and necks down at 32 and thereby causes the adhesive layers 22 and 24 to progressively debond from the base member 6 and support surface 4, respectively. As the point of adhesive release or debonding approaches the first end 26 of the base member 6, a remnant area of adhesive 34 adhered to the base member bottom surface 30 tends to flow with the stretched portion of the adhesive strip. As the remnant area 34 of adhesion moves from its original position at line C to its stretched position at line D, the base member 6 is carried with it and is displaced a distance E from its original position at line A to its displaced position at line B. The remnant adhesion area thereby maintains an adhesive bond with the base member 6 which delays the release of the base member 6 from the adhesive strip 8. This increases the likelihood that the adhesive strip will release from the support surface while the base member is still attached and therefore increases the likelihood that the base member will catapult.

Factors which contribute to the likelihood of the adhesive strip 8 releasing from the support surface 4 before releasing from the base member 6 include the following: (1) the release area 20 which is too small, (2) the elongation force required to stretch the adhesive strip 8 is too high, (3) a weak adhesive bond exists between the adhesive strip and the support surface due to an unclean support surface, inadequate pressure being applied during installation, or not allowing enough time for an effective bond to form between the adhesive strip and the support surface. Because of the variety of factors which can interfere with the predictable and effective sequential release of the adhesive article from the support surface, it is desirable to provide means whereby sequential release is more likely to be successful.

Referring now to FIGS. 5 and 6, there is shown a stretch releasing adhesive article 102 according to the present invention mounted on a support surface 4 (FIG. 5) and during removal (FIG. 6). As described previously with reference to FIGS. 1–4, the adhesive article 102 includes a base member 106 and a sequential release stretch release adhesive tape strip 108 which is arranged between and adhesively bonded to the base member 106 and the support surface 4. The adhesive strip 108 comprises a backing layer 110 having opposite top and bottom major surfaces, 112, 114, respectively, first and second ends 116, 118, respectively, and a tab portion 110a that extends beyond the end of the base member and can therefore be manually gripped by a user and pulled, thereby to stretch the adhesive strip 108 to effect stretch release of the adhesive strip 108 from the base member 106 and support surface 4. The backing layer top surface 112 includes a first non-adhesive or low adhesive portion 120, and a second adhesive portion 122. The first non-adhesive portion is arranged adjacent the adhesive strip first end 116 and defines a release area that allows for the controlled sequential release of the base member 106. The second adhesive portion 122 extends from the release area 120 to the second end 118 and includes an adhesive layer which serves to adhesively bond the adhesive strip 108 with the base member 106. The backing layer bottom surface 114 is substantially covered with and an adhesive layer 124 that extends from the first end 116 to the second end 118 of the backing layer 110 which serves to removably adhesively bond the adhesive strip 108 to the support surface 4. Additional details of the adhesive strip are described in U.S. Pat. No. 6,001,471, which is assigned to the same assignee as the present invention and is hereby incorporated by reference.

The base member 106 has first and second ends 126, 128, respectively and a generally planar bottom surface 130 which is removably bonded to the adhesive layer 124. In accordance with a characterizing feature of the invention, the base member 106 includes a stabilizer 136 which extends from the bottom surface 130 of the base member 106 adjacent the first end 116 of the adhesive strip 108. The stabilizer 136 is a generally stiff or rigid projection formed integrally with the base member. The stabilizer extends outwardly from the bottom surface 130 of the base member a distance which is less than the thickness of the adhesive strip 108 to allow the base member 106 to be pressed firmly against the support surface 4 and thereby form an effective bond with the support surface during mounting. The stabilizer is arranged to abut the first end 116 of the adhesive strip if the base member 106 begins to shift during the removal process. In this way, relative movement between the base member 106 and adhesive strip 108, which can interfere with controlled sequential release of the base member and therefore lead to catapulting, is prevented. Accordingly, the stabilizer increases the likelihood that the base member 106 will release from the adhesive strip 108 while the adhesive strip 108 is still adhered to the support surface 4. Thus, during removal, the base member 106 will simply fall or can be easily removed from its mounted position on the support surface 4. Once the base member 106 has been released from the support surface, continued stretching will cleanly release the remainder of the adhesive strip 108 from the support surface 4.

As shown in FIGS. 7–9, the stabilizer portion can be a continuous projection extending the width of the base member or one or more discrete spaced projections. In FIGS. 7a and 7b, the stabilizer 236 is a transversely extending wall arranged on the bottom surface 230 of the base member 206 adjacent the adhesive strip 208. In FIGS. 8a and 8b, the stabilizer 336 is a single projection arranged generally midway between the sides of the base member 306, and in FIGS. 9a and 9b, the stabilizer 436 includes a pair of transversely spaced projections. It will be recognized, however, that the number, shape, and arrangement of the projections can be varied without deviating from the inventive concept of the invention.

In each embodiment shown in FIGS. 7–9, the stabilizer 236, 336, 436 extends outwardly from the base member 206, 306, 406, respectively, a distance which is less than the thickness of the adhesive strip 208, 308, 408. In addition, each stabilizer 236, 336, 436 is spaced a distance from the first end 226, 326, 426 of the base member, respectively. While each stabilizer 232, 332, 432 can be arranged adjacent the first end 226, 326, 426, by providing a space, a user can apply a force to the base member first end 226, 326, 426 opposite the stabilizer to hold the base member in place during the removal process so that the stabilizer will abut the support surface 4 and act as a fulcrum, thereby causing the base member second end 228, 328, 428 to pivot away from the support surface and thereby facilitate stretching and removal.

FIG. 10 shows another embodiment of the invention wherein the stabilizer 536 is a folded piece of flexible material, such as a synthetic plastic material, which is affixed to the bottom surface 530 of the base member first end 526. The folded stabilizer forms a compressible generally V-shaped stop member having a first leg 536a portion attached to the base member 506, an apex 536b adjacent the first end 526, and an angled second leg portion 536c that extends away from the base member 506 toward the adhesive strip 508, thereby defining an open end adjacent the adhesive strip 508. Since the stop member 536 is compressible, the open end of the V can have a dimension that is at least as great as the thickness of the adhesive strip 508. Thus, when the base member 506 is pressed against the support surface 4 during installation, the stop member 536 will flatten or compress to allow the adhesive strip 508 to be pressed firmly against the support surface 4 and form an effective bond therewith.

FIG. 11 shows an alternate embodiment of the invention wherein the stabilizer 636 is formed of a compressible polymeric foam material which is adhesively bonded to the bottom surface 630 of the base member 606 adjacent the end of the adhesive strip 608. The compressible stabilizer 636 allows the base member 606 to be pressed firmly against the support surface 4 during installation so that the adhesive strip will form an effective bond with the support surface, and prevents relative movement between the base member 606 and adhesive strip 608 during the removal process to minimize catapulting. The stabilizer 636 can also include a repositionable, temporary, or readily removable adhesive on the surface adjacent the support surface to maintain the base member 606 on the support surface 4 after the adhesive strip 608 has been completely debonded from both the base member 606 and support surface. Thus, the temporary adhesive prevents the base member from falling unexpectedly during the removal process and allows the user to easily remove the base member from the support surface without damaging or leaving residue on the support surface after the adhesive strip has been fully removed from the base member and support surface.

It will be apparent to those of ordinary skill in the art that various changes and modifications may be made without deviating from the inventive concept set forth above. Thus, the scope of the present invention should not be limited to the structures described in this application, but only by the structures described by the language of the claims and the equivalents of those structures.

What is claimed is:

1. A stretch releasing adhesive article adapted to be removably affixed to a support surface, comprising
    (a) a stretch releasing adhesive strip having opposed adhesive top and bottom major surfaces and opposed first and second ends, said adhesive strip including a non-adhesive tab portion at said second end; and
    (b) a base member affixed to one of said top and bottom major surfaces, said base member having opposed top and bottom major surfaces and opposed first and second ends, said base member including a stabilizer arranged adjacent said adhesive strip first end thereby to prevent relative movement between said adhesive strip and said base member during the stretch removal of the adhesive strip from the support surface and said base member.

2. An adhesive article as defined in claim 1, wherein said stabilizer extends from said base member bottom surface first end adjacent said adhesive strip first end.

3. An adhesive article as defined in claim 2, wherein said stabilizer comprises at least one projection arranged transversely along said base member bottom surface first end.

4. An adhesive article as defined in claim 3, wherein said stabilizer is a rigid projection.

5. An adhesive article as defined in claim 3, wherein said stabilizer is compressible.

6. An adhesive article as defined in claim 5, wherein said stabilizer includes a repositionable adhesive arranged for engagement with the support surface.

7. An adhesive article as defined in claim 6, wherein said stabilizer is formed of a polymeric foam material.

8. An adhesive article as defined in claim 5, wherein said stabilizer comprises a folded flexible stop member having a tapered V-shaped configuration having a wide open end arranged to abut said adhesive strip first end.

9. An adhesive article as defined in claim 1, wherein said adhesive strip top surface first end includes a generally non-adhesive release area arranged remote from said non-adhesive tab portion and adjacent said base member stabilizer.

* * * * *